(12) United States Patent
Shibagami (10) Patent No.: US 11,625,948 B2
(45) Date of Patent: Apr. 11, 2023

(54) IMAGING CONTROL APPARATUS CAPABLE OF SELECTING DETECTED SUBJECT AND METHOD FOR THE SAME

(71) Applicant: CANON KABUSHIKI KAISHA, Tokyo (JP)

(72) Inventor: Genjiro Shibagami, Tokyo (JP)

(73) Assignee: Canon Kabashiki Kaisha, Tokyo (JP)

( * ) Notice: Subject to any disclaimer, the term of this patent is extended or adjusted under 35 U.S.C. 154(b) by 202 days.

(21) Appl. No.: 17/158,700

(22) Filed: Jan. 26, 2021

(65) Prior Publication Data

US 2021/0243359 A1    Aug. 5, 2021

(30) Foreign Application Priority Data

Feb. 3, 2020  (JP) .............................. JP2020-016217

(51) Int. Cl.
| | | |
|---|---|---|
| *G06V 40/16* | (2022.01) | |
| *G06F 18/2413* | (2023.01) | |
| *H04N 23/61* | (2023.01) | |
| *H04N 23/63* | (2023.01) | |
| *G06V 20/20* | (2022.01) | |

(52) U.S. Cl.
CPC ........ *G06V 40/161* (2022.01); *G06F 18/2413* (2023.01); *G06V 20/20* (2022.01); *H04N 23/61* (2023.01); *H04N 23/633* (2023.01)

(58) Field of Classification Search
CPC ......... H04N 5/23218; H04N 5/232939; H04N 5/232127; H04N 5/23245; H04N 5/232933; H04N 5/23219; H04N 23/61; H04N 23/633; H04N 23/611; H04N 23/631; H04N 23/667; H04N 23/675; G06K 9/627; G06V 20/20; G06V 40/161
See application file for complete search history.

(56) References Cited

U.S. PATENT DOCUMENTS

| | | | | |
|---|---|---|---|---|
| 7,492,406 | B2* | 2/2009 | Park | H04N 5/232945 |
| | | | | 348/240.2 |
| 9,001,254 | B2* | 4/2015 | Kang | H04N 5/23218 |
| | | | | 348/333.05 |
| 2005/0046730 | A1* | 3/2005 | Li | H04N 5/232945 |
| | | | | 348/333.12 |
| 2008/0240563 | A1* | 10/2008 | Takano | H04N 5/23219 |
| | | | | 382/173 |
| 2020/0106953 | A1* | 4/2020 | Suzuki | G06T 7/20 |

FOREIGN PATENT DOCUMENTS

JP          2010062655 A          3/2010

* cited by examiner

*Primary Examiner* — Timothy J Henn
(74) *Attorney, Agent, or Firm* — Canon U.S.A., Inc. IP Division

(57) ABSTRACT

An imaging control apparatus includes a detection unit configured to detect, from a captured image, subjects belonging to a plurality of types including a first type and a second type a switching unit configured to switch a type, a selection unit configured to select any subject from among a plurality of subjects belonging to the second type, and a control unit configured to perform control so as to display a first subject belonging to the first type in a first display manner and display a second subject belonging to the second type in a second display manner in a case where the type for which the predetermined processing is the first type, and display the second subject in the first display manner in response to switching to the second type by the switching unit.

14 Claims, 8 Drawing Sheets

IMAGING CONTROL APPARATUS CAPABLE OF SELECTING DETECTED SUBJECT AND METHOD FOR THE SAME

BACKGROUND

Field

The present disclosure relates to an imaging control apparatus, and, in particular, to a technique in selecting any subject from detected subjects.

Description of the Related Art

Conventionally, a technique for detecting a human face from a captured image is known. Japanese Patent Application Laid-Open No. 2010-62655 discusses that a user selects a race to detect and a face is detected based on feature data about the selected race.

The method discussed in Japanese Patent Application Laid-Open No. 2010-62655 can detect the race selected on a menu screen, but fails to allow the user to change the type of the subject while viewing the image being currently captured or switch the subject selected among subjects belonging to the changed type.

SUMMARY

The present disclosure is directed to providing an imaging control apparatus that allows a user to switch a desired subject with excellent usability when a plurality of types of subjects can be detected.

According to an aspect of the present disclosure, an imaging control apparatus includes a detection unit configured to detect, from a captured image, subjects belonging to a plurality of types including a first type and a second type, a switching unit configured to switch a type for which predetermined processing is to be performed from any of the first type and the second type, a selection unit configured to select any subject from among a plurality of subjects belonging to the second type in the captured image and among the detected subjects, and a control unit configured to perform control so as to display a first subject belonging to the first type in a first display manner and display a second subject belonging to the second type in a second display manner in a case where the type for which the predetermined processing is to be performed is switched to the first type by the switching unit, and display the second subject in the first display manner in response to switching of the type for which the predetermined processing is to be performed from the first type to the second type by the switching unit.

Further features will become apparent from the following description of exemplary embodiments with reference to the attached drawings.

DESCRIPTION OF THE EMBODIMENTS

An exemplary embodiment will be described in detail below with reference to the accompanying drawings.

It is to be noted that the following exemplary embodiment is merely one example and can be appropriately modified or changed depending on individual constructions and various conditions of apparatuses. Thus, the present disclosure is in no way limited to the following exemplary embodiment.

In the following description, representative exemplary embodiments of the present disclosure will be described with reference to the accompanying drawings.

Figure 1:
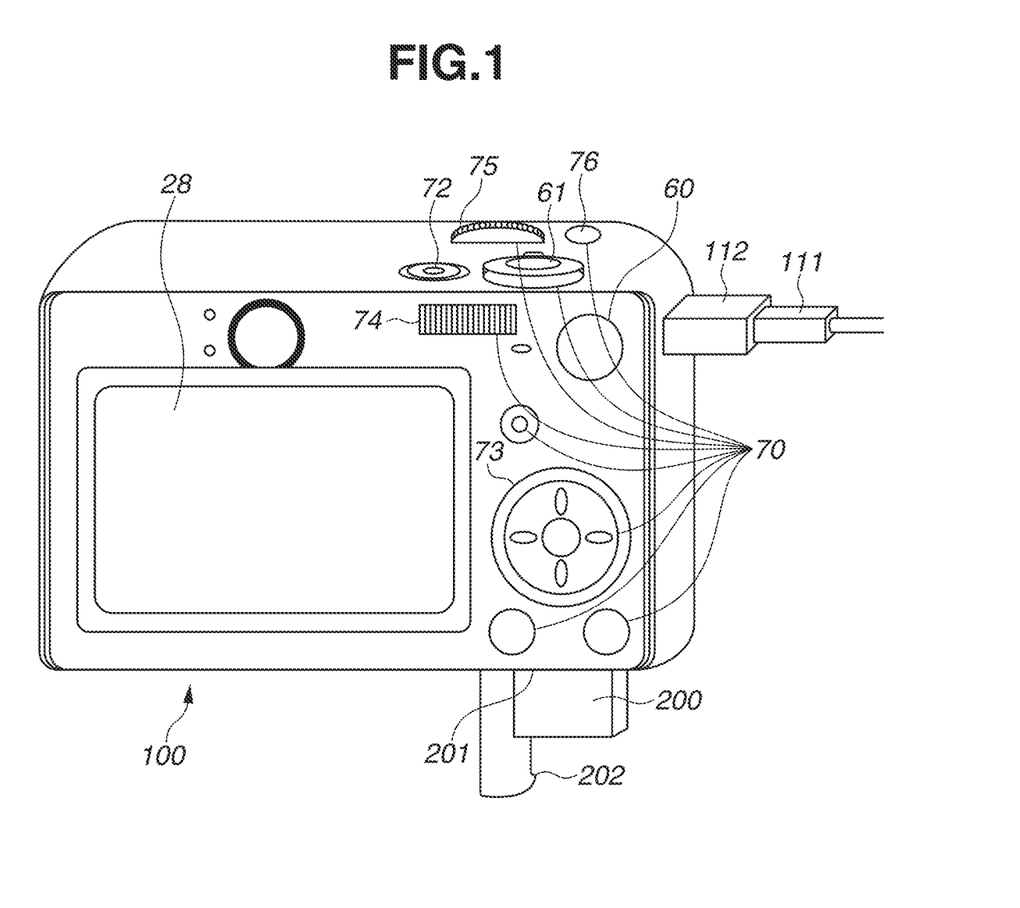
FIG. 1 illustrates an exterior appearance indicating the configuration of a digital camera according to an exemplary embodiment.

FIG. 1 illustrates an exterior appearance of a digital camera 100 as an example of an apparatus to which the present disclosure can be applied. The digital camera 100 is an example of an imaging control apparatus, and can capture a still image and a moving image.

A display unit 28 is a display unit that displays an image and various kinds of information. A shutter button 61 is an operation unit for issuing an imaging instruction. A mode selection switch 60 is an operation unit for switching various modes. A connector 112 is used for connecting to an external apparatus, such as a personal computer and a printer, and can connect the digital camera 100 to a connection cable 111. An operation unit 70 includes operation members that receive various operations from a user, such as various switches, a button, and a touch panel.

A controller wheel 73, a sub electronic dial 74, and a main electronic dial 75 are rotationally operable operation members included in the operation unit 70. A multifunction button 76 is a pressing button included in the operation unit 70. A power switch 72 is a pressing button for switching a power-on and a power-off. A recording medium 200 is a recoding medium, such as a memory card and a hard disk. A recording medium slot 201 is a slot for housing the recording medium 200. The recording medium 200 housed in the recording medium slot 201 allows data to be recorded therein or be played back therefrom by communicating with the digital camera 100. A cover 202 is a cover of the recording medium slot 201. FIG. 1 illustrates the digital camera 100 with the cover 202 opened and the recording medium 200 partially extracted and exposed from the recording medium slot 201.

Figure 2:
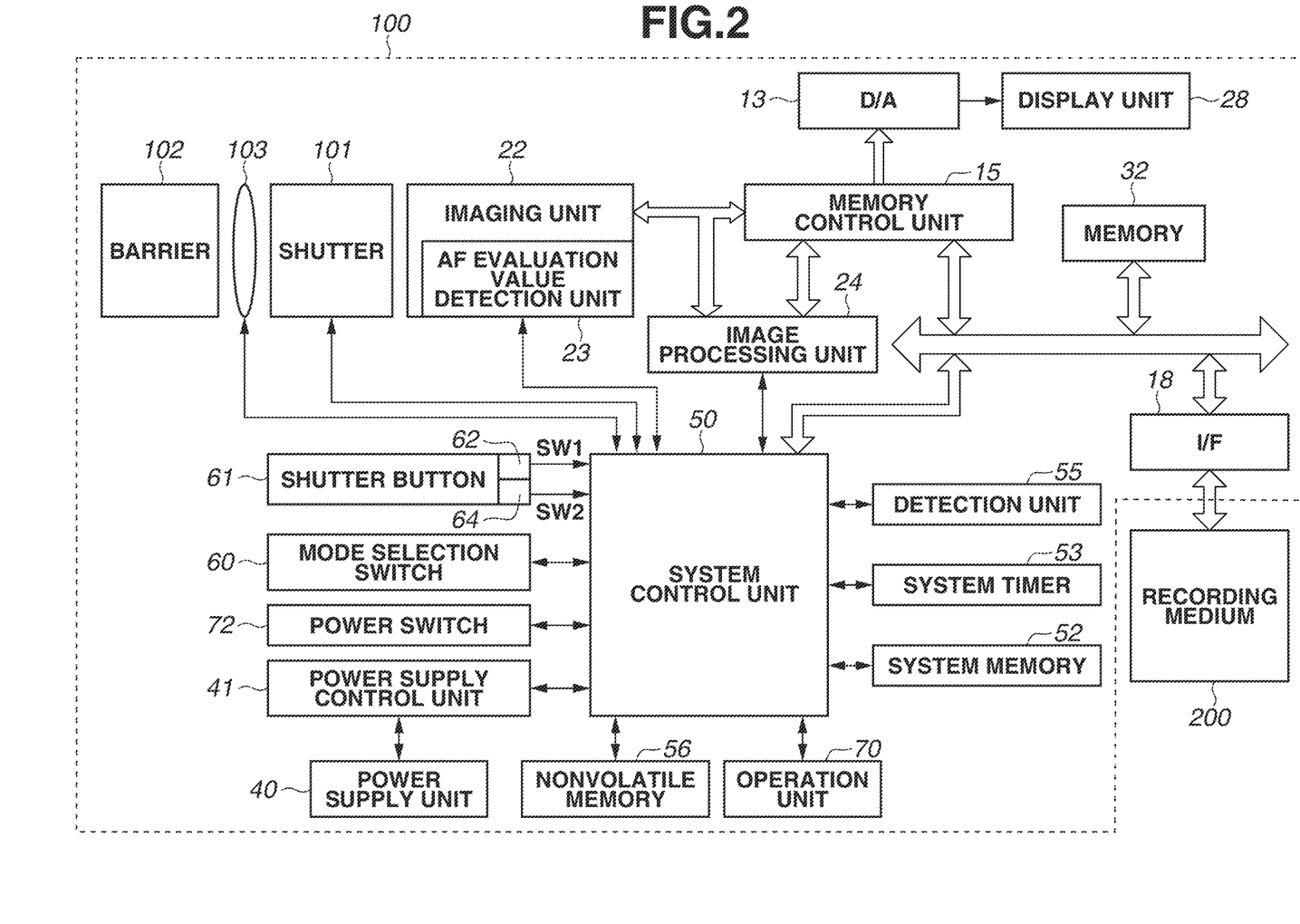
FIG. 2 is a block diagram illustrating an example of the configuration of the digital camera according to the present exemplary embodiment.

FIG. 2 is a block diagram illustrating an example of the configuration of the digital camera 100 according to the present exemplary embodiment.

In FIG. 2, an imaging lens 103 is a lens unit including a zoom lens and a focus lens. A shutter 101 includes a diaphragm function. An imaging unit 22 includes an image sensor formed by, for example, a charge-coupled device (CCD) or complementary metal-oxide semiconductor (CMOS) image sensor that converts an optical image into an electric signal, and an automatic focus (AF) evaluation value detection unit 23. In the image sensor, each of two-dimensionally arrayed pixels includes a plurality of photoelectric conversion regions. An image corresponding to one viewpoint is individually formed from outputs from a group of photoelectric conversion regions located at the same position in the individual pixels, and therefore a plurality of parallax images corresponding to different viewpoints can be acquired by one image sensor. A captured image that would be acquired by a normal image sensor, in which each pixel includes one photoelectric conversion region, can be acquired by adding outputs from the plurality of photoelectric conversion regions for each of the pixels at the same time.

In the present exemplary embodiment, the image sensor is configured in such a manner that each of the pixels includes two independent photoelectric conversion regions (photodiodes) A and B. Two parallax images A and B can be acquired by acquiring an output from the photoelectric conversion region A and an output from the photoelectric conversion region B as individually independent images. The normal captured image can be acquired by adding the outputs from the photoelectric conversion regions A and B for each of the pixels. The captured image can be acquired by adding and combining the signals of the photoelectric conversion regions of each of the pixels by, for example, an image processing unit 24 as will be described below, but may be acquired by adding and combining these signals by the imaging unit 22. In this manner, the parallax images A and B and the captured image can be acquired by carrying out imaging (exposure) once.

The digital camera 100 will be described as being configured to acquire the two parallax images at the same time in the description of the present exemplary embodiment, but may be configured to acquire more parallax images at the same time by receiving a light flux incident near an imaging plane on a larger number of pixels (for example, 3×3 pixels). Further, the imaging unit 22 includes an analog-to-digital (A/D) conversion processing function.

The AF evaluation value detection unit (a focus detection unit) 23 calculates an AF evaluation value (a focus state) based on contrast information acquired from a digital image signal and a phase difference acquired from the parallax images, and outputs the acquired AF evaluation value from the imaging unit 22 to a system control unit 50.

A barrier 102 is a protection member provided so as to cover an imaging system including the imaging lens 103, and prevents dirt and damage of the imaging system including the imaging lens 103, the shutter 101, and the imaging unit 22.

The image processing unit 24 performs resizing processing, such as predetermined pixel interpolation and size reduction, and color conversion processing on image data output from the imaging unit 22 or data from a memory control unit 15. Further, the image processing unit 24 can acquire distance information of a subject. More specifically, the image processing unit 24 can acquire the distance to the subject by detecting the phase difference from the two input parallax images, and acquire the distance information from the imaging unit 22 to the subject pixel by pixel. Further, the image processing unit 24 performs predetermined calculation processing using the captured image data, and the system control unit 50 controls an exposure and distance measurement based on the acquired result of the calculation. Based thereon, automatic exposure (AE) processing and electronic flash (EF) (flash automatic light adjustment and emission) processing of the Through-The-Lens (TTL) method are performed under control of the system control unit 50.

Further, the image processing unit 24 performs AF processing under control of the system control unit 50, and the output of the AF evaluation value detection unit 23 included in the imaging unit 22 may be used at this time. Further, the image processing unit 24 performs predetermined calculation processing using the captured image data, and the system control unit 50 performs automatic white balance (AWB) processing using the TTL method based on the acquired result of the calculation.

The image processing unit 24 further extracts feature data from the captured image data. A memory 32 stores therein master data with which feature data for each type of the subject is registered. The master data is prepared for each type of the subject, such as data for a human, data for a human pupil, data for an animal, data for an animal pupil, and data for a vehicle. Due to this preparation, the digital camera 100 can detect a plurality of subjects, such as a human, a human pupil, an animal, an animal pupil, and a vehicle. A nonvolatile memory 56 stores therein each of detection types of a main subject and a sub subject indicating types to be detected as the main subject and the sub subject. The detection type of the main subject corresponds to a first type, and the detection type of the sub subject corresponds to a second subject.

When the master data for the main subject and the master data for the sub subject are read out from the memory 32 under control of the memory control unit 15, the system control unit 50 compares the extracted feature data and the read master data. As a result, the digital camera 100 can detect each of the main subject and the sub subject. The image processing unit 24 can further perform tracking processing of tracking the subject detected from the captured image data using pattern matching or the like under control of the system control unit 50.

The output data of the imaging unit 22 is written into the memory 32 via the image processing unit 24 and the memory control unit 15, or is directly written into the memory 32 via the memory control unit 15. The memory 32 stores therein the image data acquired by the imaging unit 22 and subjected to the A/D conversion, and image data to be displayed on the display unit 28.

The memory 32 has a storage capacity sufficient to store a predetermined number of still images or a moving image and audio lasting for a predetermined time period. The memory 32 also serves as a memory for an image display (a video memory). A digital-to-analog (D/A) converter 13 converts the data for the image display that is stored in the memory 32 into an analog signal, and supplies it to the display unit 28. In this manner, the image data for the display that is written in the memory 32 is displayed on the display unit 28 via the D/A converter 13.

The display unit 28 presents a display according to the analog signal supplied from the D/A converter 13 on a display device, such as a liquid crystal display (LCD). The digital signal first subjected to the A/D conversion by the imaging unit 22 and then stored into the memory 32 is converted into the analog signal by the D/A converter 13, and is sequentially transferred to the display unit 28. As a result, the display unit 28 functions as an electronic viewfinder, and displays a through-the-lens image (displays a live view).

The nonvolatile memory 56 is a memory as an electrically erasable and recordable recording medium, and, for example, an electrically erasable programmable read only memory (EEPROM) is used as it. The nonvolatile memory 56 stores therein a constant, a program, and the like for the operation of the system control unit 50. The program described here refers to a computer program for performing a flowchart that will be described below in the present exemplary embodiment.

The system control unit 50 is a control unit including at least one processor, and controls the entire digital camera 100. The system control unit 50 realizes each processing procedure in the present exemplary embodiment that will be described below by executing the above-described program recorded in the nonvolatile memory 56. For example, a random access memory (RAM) is used as a system memory 52. The constant and the variable for the operation of the system control unit 50, the program read out from the nonvolatile memory 56, and the like are loaded into the system memory 52. The system control unit 50 also performs display control by controlling the memory 32, the D/A converter 13, the display unit 28, and the like.

A system timer 53 is a time measurement unit that measures a time for use in various controls, and a time of a built-in clock. The mode selection switch 60, the shutter button 61, and the operation unit 70 are operation units for inputting various operation instructions to the system control unit 50. The mode selection switch 60 switches the operation mode of the system control unit 50 to any of a still image recording mode, a moving image capturing mode, a playback mode, and the like.

Modes contained in the still image recording mode include an automatic imaging mode, an automatic scene determination mode, a manual mode, an aperture priority mode (an aperture value (Av) mode), and a shutter speed priority mode (a time value (Tv) mode). The modes contained in the still image recording mode further includes various scene modes, each of which corresponds to imaging settings prepared for each imaging scene, a program AE mode, a custom mode, and the like. The operation mode is directly switched to any of these modes using the mode selection switch 60. Alternatively, the digital camera 100 may be configured in such a manner that any of a plurality of displayed modes is selected, and the operation mode is switched using another operation member after the screen is first switched to a screen indicating a list of imaging modes using the mode selection switch 60. Similarly, the moving image capturing mode can also include a plurality of modes.

A first shutter switch 62 is switched on halfway through the operation of the shutter button 61 provided on the digital camera 100, i.e., upon a half-press of the shutter button 61 (an imaging preparation instruction), and generates a first shutter switch signal SW1. In response to the first shutter switch signal SW1, the system control unit 50 starts operations such as the AF processing, the AE processing, the AWB processing, and the EF (flash preliminary emission) processing.

A second shutter switch 64 is switched on SW2 upon completion of the operation of the shutter button 61, i.e., upon a full-press of the shutter button 61 (an imaging instruction), and generates a second shutter switch signal. In response to the second shutter switch signal SW2, the system control unit 50 starts a series of imaging processing operations from reading out the signal from the imaging unit 22 to writing the image data into the recording medium 200.

Each of the operation members in operation unit 70 is appropriately assigned to the corresponding function for each scene and is caused to work as various functional buttons, with, for example, an operation of selecting various functional icons displayed on the display unit 28. Examples of the functional buttons include a menu button, an end button, a return button, an image jump button, a jump button, a depth-of-field preview button, and an attribute change button. For example, when the menu button is pressed, a menu screen, on which various settings can be made, is displayed on the display unit 28. The user can intuitively configure the various settings using the menu screen displayed on the display unit 28, an up, down, left, and right four-direction button, and a SET button.

The controller wheel 73, the sub electronic dial 74, and the main electronic dial 75 are rotationally operable operation members included in the operation unit 70 and are used when, for example, a selection item is specified together with the direction button. When the controller wheel 73, the sub electronic dial 74, or the main electronic dial 75 is rotationally operated, an electric pulse signal is generated according to the operation amount, and the system control unit 50 controls each of the units of the digital camera 100 based on this pulse signal. The system control unit 50 determines the angle by which the controller wheel 73, the sub electronic dial 74, or the main electronic dial 75 is rotationally operated, how many times it is rotated and the like based on this pulse signal.

Each of the controller wheel 73, the sub electronic dial 74, and the main electronic dial 75 may be any operation member with which a rotational operation can be detected. For example, any of the controller wheel 73, the sub electronic dial 74, and the main electronic dial 75 may be a dial operation member that the controller wheel 73, the sub electronic dial 74, or the main electronic dial 75 itself is rotated according to the user's rotational operation and generates the pulse signal. Any of the controller wheel 73, the sub electronic dial 74, and the main electronic dial 75 can be an operation member realized using a touch sensor or an operation member that the controller wheel 73, the sub electronic dial 74, or the main electronic dial 75 itself is not rotated and detects, for example, a movement of the user's finger on the controller wheel 73, the sub electronic dial 74, or the main electronic dial 75.

A power supply control unit 41 includes a battery detection circuit, a direct-current-to-direct-current (DC-DC) converter, and a switch circuit that switches a block to which power is supplied. The power supply control unit 41 detects whether a battery is mounted, the type of the battery, and the remaining battery level. The power supply control unit 41 controls the DC-DC converter based on a result of this detection and an instruction from the system control unit 50, and supplies a required voltage to each of the units including the recording medium 200 for a required time period.

A power supply unit 40 includes a primary battery, such as an alkaline battery and a lithium battery, a secondary battery, such as a nickel—cadmium (NiCd) battery, a nickel-metal hydride (NiMH) battery, and a lithium (Li) battery, and an alternating-current (AC) adapter. A recording medium interface (I/F) 18 is an interface with the recording medium 200, such as a memory card and a hard disk. The recording medium 200 is a recording medium for recording the captured image, such as a memory card, and is formed by a semiconductor memory, a magnetic disk, or the like.

A detection unit 55 includes a gyroscope sensor and another sensor, and acquires, for example, angular speed information and orientation information about the digital camera 100. The angular speed information includes information about an angular speed and an angular acceleration at the time of panning imaging by the digital camera 100. The orientation information includes information about, for example, an inclination of the digital camera 100 with respect to the horizontal direction.

Figure 3:
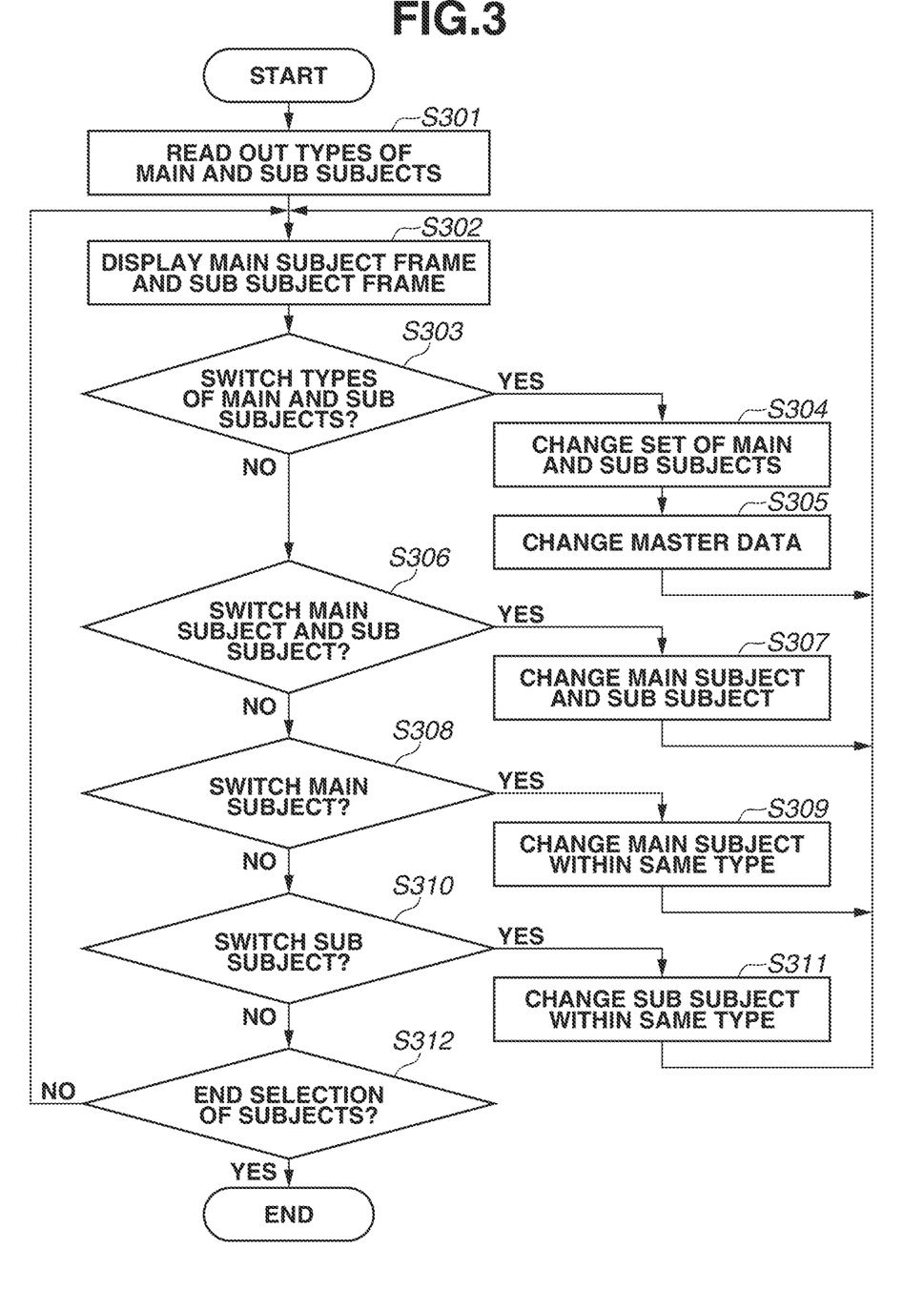
FIG. 3 is a flowchart illustrating processing performed by the digital camera according to the present exemplary embodiment.

Next, an example of processing performed by the digital camera 100 according to the present exemplary embodiment will be described with reference to a flowchart illustrated in FIG. 3. Each process in the flowchart illustrated in FIG. 3 is realized by the system control unit 50 loading the program stored in the nonvolatile memory 56 into the system memory 52 to execute the program and controlling each of the functional blocks. The present processing is started when the digital camera 100 is powered on and becomes ready to present the live view display on the display unit 28.

In step S301, the system control unit 50 reads out the types set as the detection types of the main subject and the sub subject from the nonvolatile memory 56. By this readout, the master data corresponding to the types set as the detection types of the main subject and the sub subject is read out to the image processing unit 24. The master data is stored in the memory 32 and is used by being read out to the image processing unit 24 under the control of the memory control unit 15, but detecting many types of subjects at the same time may make the processing time-consuming because the detection processing takes a long time. Thus, the types settable as the detection types of the main subject and the sub subject are assumed to be one type for each of them in the present exemplary embodiment but do not have to be one type for each of them.

In the present exemplary embodiment, the human and the vehicle are set as the detection type of the main subject and the detection type of the sub subject, respectively, and the master data for the human and the master data for the vehicle are read out.

In step S302, the system control unit 50 detects each of the main subject and the sub subject according to the types read out in step S301. The system control unit 50 then displays a main subject frame on the subject detected as the main subject and displays a sub subject frame on the subject detected as the sub subject on the display unit 28.

Figure 5A:
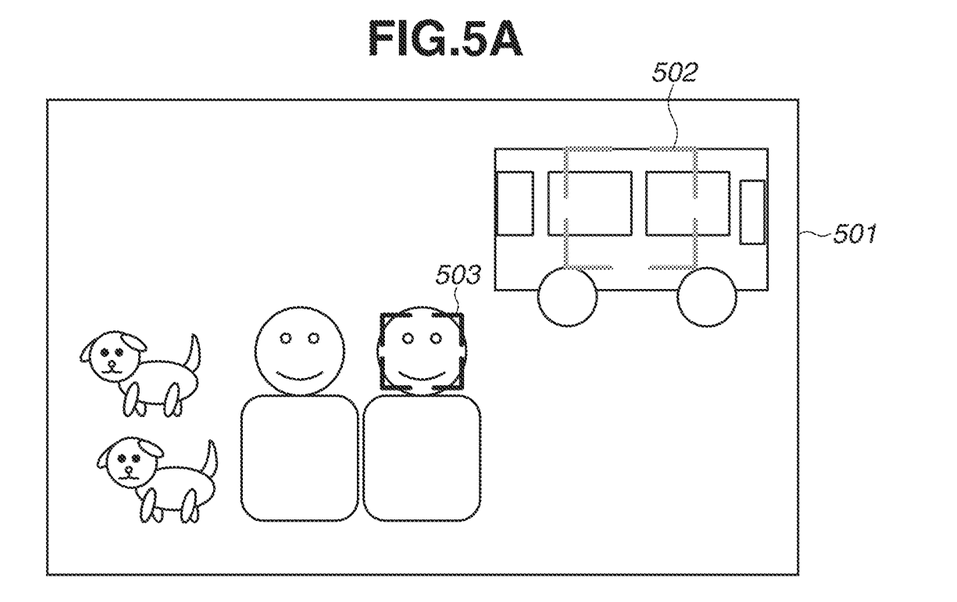
FIGS. 5A, 5B, 5C, 5D, 5E, 5F, 5G, and 5H each illustrate a display unit with subject frames displayed thereon.

FIG. 5A illustrates a state in which the main subject frame and the sub subject frame are displayed. A live view image 501 is displayed on the display unit 28. A sub subject frame 502 is displayed on the subject detected as the sub subject. A main subject frame 503 is displayed on the subject detected as the main subject. The main subject frame corresponds to a first display item, and the sub subject frame corresponds to a second display item.

In FIG. 5A, the main subject frame 503 is displayed on the right-side person, and the sub subject frame 502 is displayed on the vehicle. If no subject corresponding to the types of the main subject and the sub subject read out in step S301 is detected, the main subject frame 503 and the sub subject frame 502 are not displayed. Even if a plurality of subjects is detected as the main subject in step S302 (for example, the right-side person and the left-side person in FIG. 5A), the target on which the main subject frame is displayed is one subject. Similarly, even if a plurality of subjects is detected as the sub subject in step S302, the target on which the sub subject frame is displayed is one subject. However, the detection of the subject is conducted for both the main subject and the sub subject.

Further, the main subject frame and the sub subject frame are displayed in visually different manners to be distinguishable from each other. The main subject frame 503 is displayed in black and the sub subject frame 502 is displayed in gray in the present exemplary embodiment. The display manners of the main subject frame 503 and the sub subject frame 502 are not limited thereto and the main subject frame 503 and the sub subject frame 502 may be displayed in other manners such as being displayed as a solid line and a dotted line, being displayed in different colors such as red and black, and being displayed in such a manner that one of the frames is blinked. The main subject frame 503 and the sub subject frame 502 may be displayed in any manner as long as they are displayed distinguishably.

In the present exemplary embodiment, the system control unit 50 performs predetermined processing, such as the AF processing, the AE processing, and the tracking processing, on the subject with the main subject frame displayed thereon. More specifically, a subject with a main subject frame of a tracking AF target displayed thereon is targeted for the tracking AF while the tracking AF is set, and the AF processing is performed on the subject with the main subject frame displayed thereon according to an AF instruction while the single-point AF is set. The system control unit 50 functions as a control unit. For example, the predetermined processing, i.e., the AF processing, is performed on the right-side person with the main subject frame 503 displayed thereon in FIG. 5A. By contrast, the AF processing is not performed on the subject with the sub subject frame displayed thereon although the sub subject frame is displayed thereon. Different processing from the processing for the main subject may also be performed on the subject with the sub subject frame displayed thereon. For example, only distance measurement and light metering are carried out on the subject with the sub subject frame displayed thereon.

In step S303, the system control unit 50 determines whether an operation for switching the types set as the detection types of the main subject and the sub subject is performed. If the system control unit 50 determines that the operation for changing the types is performed (YES in step S303), the processing proceeds to step S304. If the system control unit 50 determines that the operation for changing the types is not performed (NO in step S303), the processing proceeds to step S306.

The operation for changing the types set as the detection types of the main subject and the sub subject will be described in detail with reference to FIG. 4. In a case where the types set as the detection types of the main subject and the sub subject are changed, the system control unit 50 displays a menu screen 401 for changing the settings of the detection types of the main subject and the sub subject on the display unit 28. An item list 402, which indicates a combination of the detection types of the main subject and the sub subject to which the settings can be changed (the main subject/the sub subject), is displayed on the menu screen 401.

Figure 4:
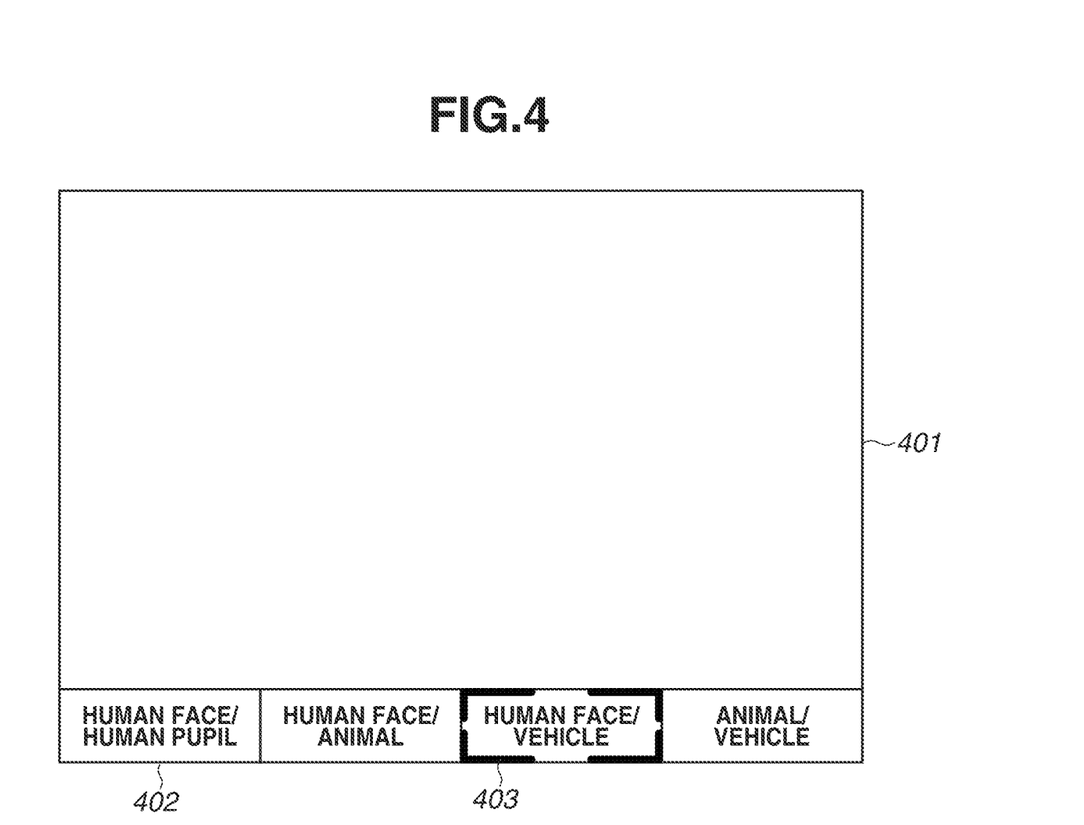
FIG. 4 illustrates an example of a menu screen according to the present exemplary embodiment.

Combinations "human face/human pupil", "human face/animal", "human face/vehicle", and "animal/vehicle" are displayed as the main subject/the sub subject in the item list 402 in FIG. 4. A cursor 403 indicates the selected combination of the detection types of the main subject and the sub subject. This menu screen 401 can be called from inside a menu selection screen and can also be called by operating the controller wheel 73.

After the menu screen 401 is displayed on the display unit 28, the user moves the cursor 403 by operating the controller wheel 73 and selects one combination among the combinations of the detection types of the main subject and the sub subject displayed in the item list 402. By this selection, the user can change the types set as the detection types of the main subject and the sub subject. The digital camera 100 is assumed to cause the user to select the detection types of the main subject and the sub subject from the preset combinations in the present exemplary embodiment, but may be configured to cause the user to select the detection type of the main subject and the detection type of the sub subject individually.

In step S304, the system control unit 50 switches the detection types of the main subject and the sub subject stored in the nonvolatile memory 56 in accordance with the operation for switching the types set as the detection types of the main subject and the sub subject. In the present exemplary embodiment, the detection types of the main subject and the sub subject are changed from the human/vehicle to the human/animal, and therefore the detection type of the sub subject is changed from the vehicle to the animal.

In step S305, the system control unit 50 changes the master data set to the image processing unit 24 based on the detection types of the main subject and the sub subject switched in step S304. In the present exemplary embodiment, the system control unit 50 reads out the master data for the animal from the memory 32, and changes the master data of the sub subject from the master data for the vehicle to the master data for the animal.

Figure 5B:
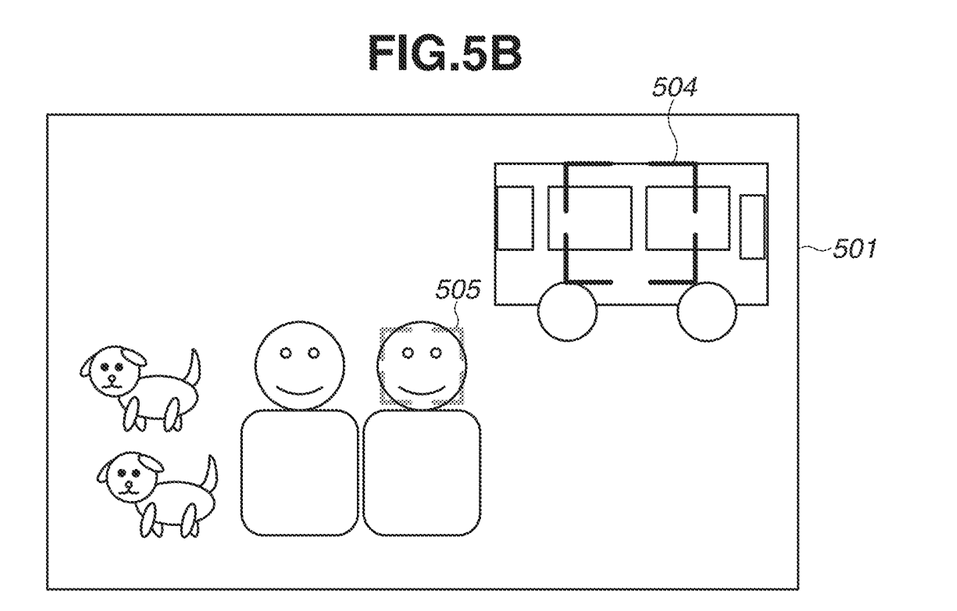
Figure 5C:
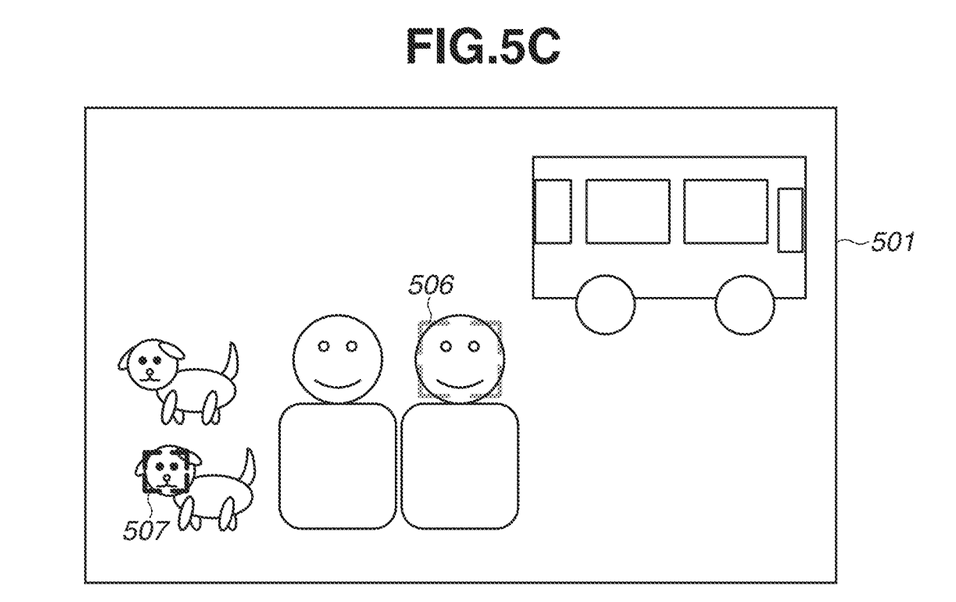
Figure 5D:
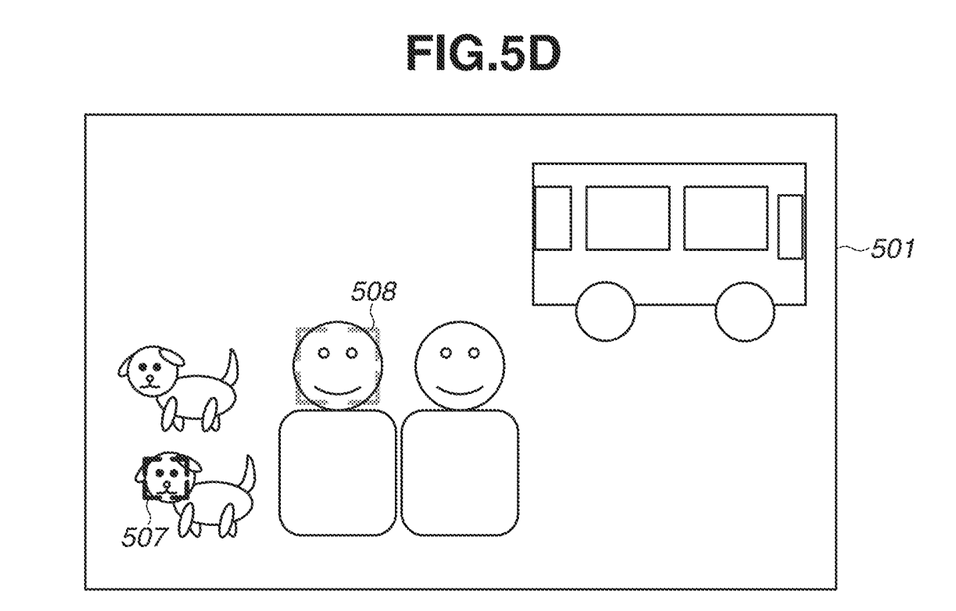
Figure 5E:
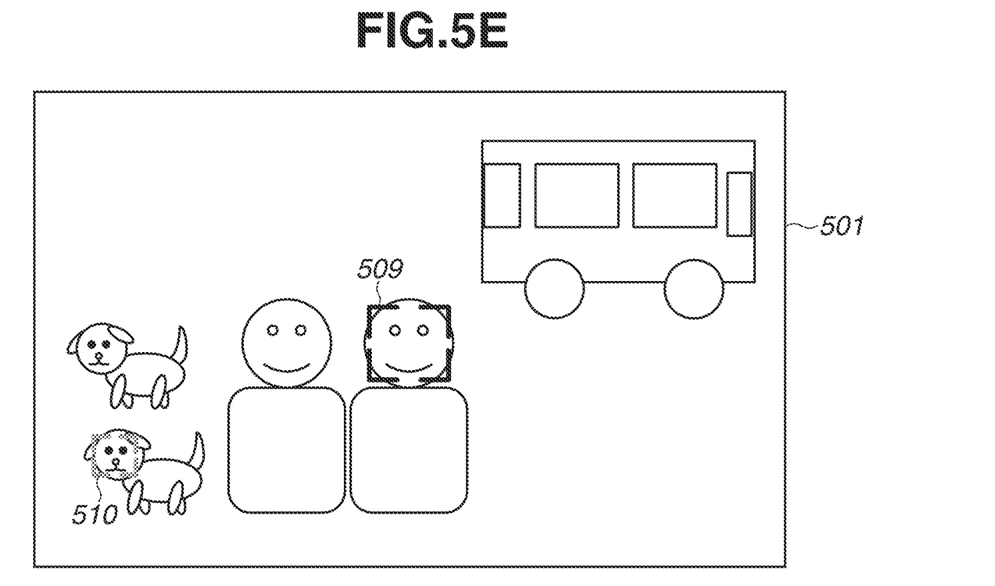

FIG. 5E illustrates a state in which the processing returns to step S302 and the main subject frame and the sub subject frame are displayed after the master data is changed in step S305 from the state illustrated in FIG. 5A. A main subject frame 509 displayed on the right-side person remains unchanged while a sub subject frame 510, which has been displayed on the vehicle, is moved to the lower-side animal and displayed thereon. In this manner, when the detection type of the sub subject is changed, the sub subject frame is displayed on the subject belonging to the type after the change (the animal in the present example). Similarly, when the detection type of the main subject is changed, the main subject frame is displayed on the subject belonging to the type after the change.

In step S306, the system control unit 50 determines whether an operation for switching the type set as the detection type of the main subject and the type set as the detection type of the sub subject (hereinafter referred to as an operation for switching the main subject and the sub subject) is performed. The operation for switching the main subject and the sub subject is performed by pressing the multifunction button 76 in the present exemplary embodiment, but may be performed by operating any operation member assigned to this function or may be even a touch operation. If the system control unit 50 determines that the operation for switching the main subject and the sub subject is performed (YES in step S306), the processing proceeds to step S307. If the system control unit 50 determines that the operation for switching the main subject and the sub subject is not performed (NO in step S306), the processing proceeds to step S308.

In step S307, the system control unit 50 changes the subject targeted for the predetermined processing, such as the AF processing and the AE processing, to the subject on which the sub subject frame has been displayed thereon before the switching. More specifically, while the tracking AF is set, the subject targeted for the tracking AF is changed to the subject on which the sub subject frame has been displayed (selected from among the sub subjects) before the switching. While the single-point AF is set, the AF processing is performed in accordance with the AF instruction on the subject on which the sub subject frame has been displayed (selected among the sub subjects) before the switching. In the case where the digital camera 100 is set so as to perform different processing from the predetermined processing, such as the AF processing and the AE processing, on the subject with the sub subject frame displayed thereon, the system control unit 50 performs the above-described set processing on the subject on which the main subject frame has been displayed before the switching.

When the processing returns to step S302 after step S307, the system control unit 50 displays the sub subject frame on the subject on which the main subject frame has been displayed before the switching, and displays the main subject frame on the subject on which the sub subject frame has been displayed before the switching.

FIG. 5B illustrates a state in which the processing returns to step S302 and the main subject frame and the sub subject frame are displayed after the main subject and the sub subject are switched in step S307 from the state illustrated in FIG. 5A. As seen from FIGS. 5A and 5B, the subject with the main subject frame displayed thereon and the subject with the sub subject frame displayed thereon are switched around. More specifically, before the switching, the sub subject frame 502 is displayed on the vehicle and the main subject frame 503 is displayed on the right-side person as illustrated in FIG. 5A. When the switching operation is performed by pressing the multifunction button 76 in this state, a main subject frame 504 is displayed on the vehicle and a sub subject frame 505 is displayed on the right-side person as illustrated in FIG. 5B.

In this manner, the user can easily switch around the main subject and the sub subject with a one-touch operation while viewing the live view image. Thus, the user can easily change the AF target in such a manner that the human is kept in focus until the vehicle approaches and then the vehicle is brought into focus when the approaching vehicle is in close proximity. Since the sub subject is selected in advance, when being able to switch the next AF target with one touch, the user can save an operation for selecting the next subject, thus quickly proceeding to the next imaging.

In step S308, the system control unit 50 determines whether an operation for switching the main subject is performed. The operation for switching the main subject refers to an operation for switching the subject with the main subject frame displayed thereon to another subject belonging to the detection type of the main subject when a plurality of main subjects is detected. The operation for switching the main subject is performed by rotationally operating the main electronic dial 75, but may be any operation as long as it is an operation on the operation member assigned to this function. For example, the subject with the main subject frame displayed thereon may be switched directly by a touch operation on the touch panel.

If the system control unit 50 determines that the main electronic dial 75 is rotationally operated and the operation for switching the main subject is performed (YES in step S308), the processing proceeds to step S309. If the system control unit 50 determines that the operation for switching the main subject is not performed (NO in step S308), the processing proceeds to step S310.

In step S309, the system control unit 50 changes the subject targeted for the predetermined processing such as the AF processing and the AE processing to another subject belonging to the detection type of the main subject in accordance with the operation in step S308. After step S309, the processing returns to step S302, in which the system control unit 50 displays the main subject frame after moving it to the other subject belonging to the detection type of the main subject according to the operation in step S308. The subject with the main subject frame displayed thereon after the movement is targeted for the predetermined processing.

Figure 5F:
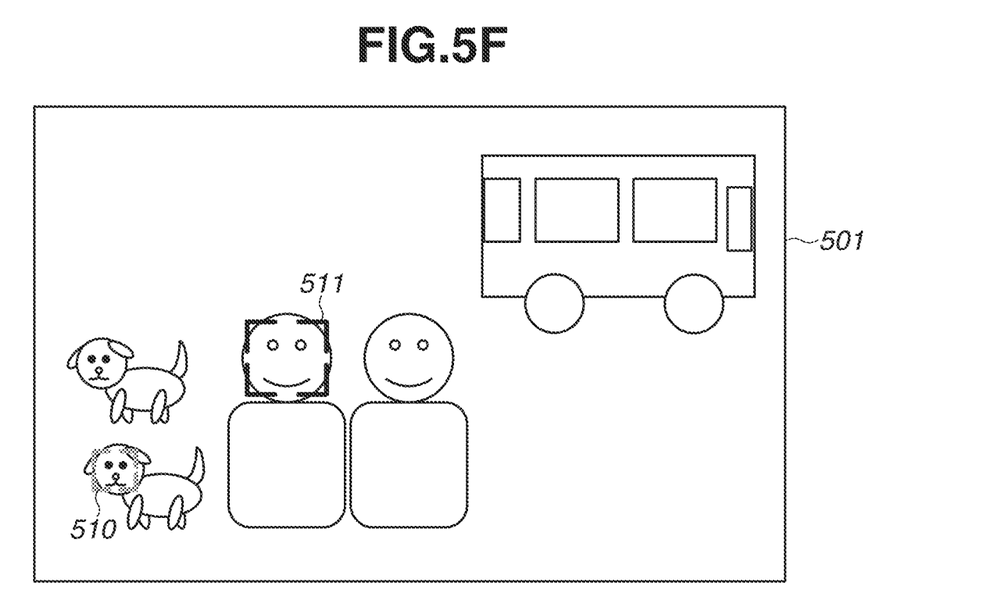

FIG. 5F illustrates a state in which the processing returns to step S302 and the main subject frame and the sub subject frame are displayed after the operation for switching the main subject is performed in step S309 from the state illustrated in FIG. 5E. As seen from FIGS. 5E and 5F, the subject with the main subject frame displayed thereon is switched.

More specifically, before the operation for switching the main subject is performed, the main subject frame 509 is displayed on the right-side person and the sub subject frame 510 is displayed on the lower-side animal as illustrated in FIG. 5E. In a case where the operation for switching the main subject is performed by the main electronic dial 75 being rotationally operated in this state, the sub subject frame 510 displayed on the lower-side animal remains unchanged while a main subject frame 511 is moved from the right-side person to the left-side person and displayed thereon as illustrated in FIG. 5F.

In the present exemplary embodiment, the subject with the main subject frame displayed thereon is sequentially switched in the clockwise or counterclockwise direction in accordance with the order in which the subjects belonging to the detection type of the main subject are laid out according to the direction in which the main electronic dial 75 is rotated (in the clockwise or counterclockwise direction) and the amount by which the main electronic dial 75 is operated. The subject with the main subject frame displayed thereon may be sequentially switched in a predetermined direction, such as the clockwise direction and the counterclockwise direction, in accordance with the order in which the subjects belonging to the detection type of the main subject are laid out based on the number of times that the button operation is performed.

In this manner, the user can easily change the main subject within the same type with an intuitive operation while viewing the live view image.

In step S310, the system control unit 50 determines whether an operation for switching the sub subject is performed. The operation for switching the sub subject refers to an operation for switching the subject with the sub subject frame displayed thereon to another subject belonging to the detection type of the sub subject when a plurality of sub subjects is detected. The operation for switching the sub subject is performed by rotationally operating the sub electronic dial 74, but may be any operation as long as it is an operation on the operation member assigned to this function. For example, the subject with the sub subject frame displayed thereon may be switched directly by a touch operation on the touch panel.

If the system control unit 50 determines that the sub electronic dial 74 is rotationally operated and the operation for switching the sub subject is performed (YES in step S310), the processing proceeds to step S311. If the system control unit 50 determines that the operation for switching the sub subject is not performed (NO in step S310), the processing proceeds to step S312.

In step S311, the system control unit 50 changes the subject with the sub subject frame displayed thereon to another subject within the detection type of the sub subject based on the operation in step S310. After step S311, the processing returns to step S302, in which the system control unit 50 displays the sub subject frame after moving it to the other subject belonging to the detection type of the sub subject based on the operation in step S310. This means that the AF processing is performed on the subject with the sub subject frame displayed thereon after the movement when the operation for switching the main subject and the sub subject is performed in step S306.

FIG. 5D illustrates a state in which the processing returns to step S302 and the main subject frame and the sub subject frame are displayed after the operation for switching the sub subject is performed in step S311 from a state illustrated in FIG. 5C. FIG. 5H illustrates a state in which the processing returns to step S302 and the main subject frame and the sub subject frame are displayed after the operation for switching the sub subject is performed in step S311 from a state illustrated in FIG. 5G. As seen from FIGS. 5C and 5D and FIGS. 5G and 5H, the subject with the sub subject frame displayed thereon is switched.

More specifically, before the operation for switching the sub subject is performed, a main subject frame 507 is displayed on the lower-side animal and a sub subject frame 506 is displayed on the right-side person as illustrated in FIG. 5C. In a case where the operation for switching the sub subject is performed by the sub electronic dial 74 being rotationally operated in this state, the main subject frame 507 displayed on the lower-side animal remains unchanged while a sub subject frame 508 is moved from the right-side person to the left-side person and displayed thereon as illustrated in FIG. 5D.

Figure 5G:
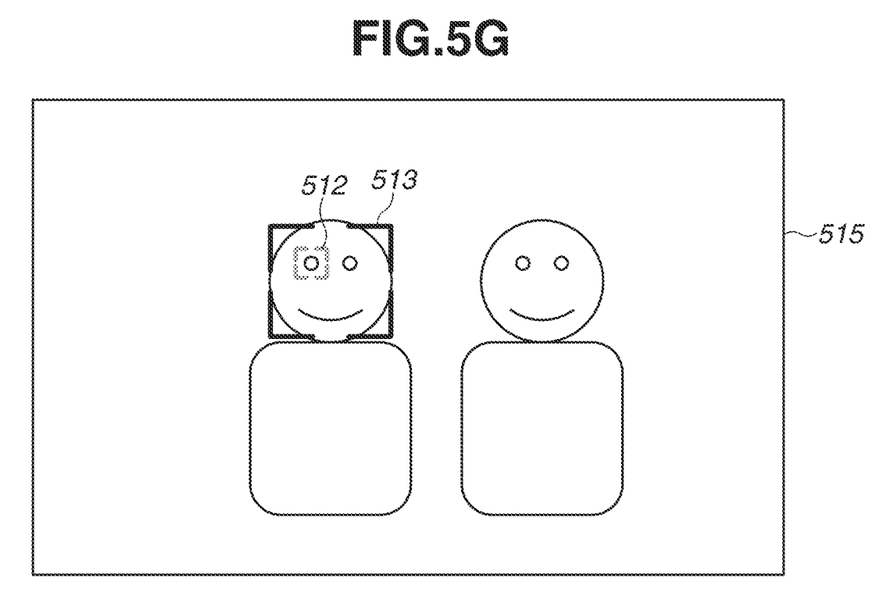
Figure 5H:
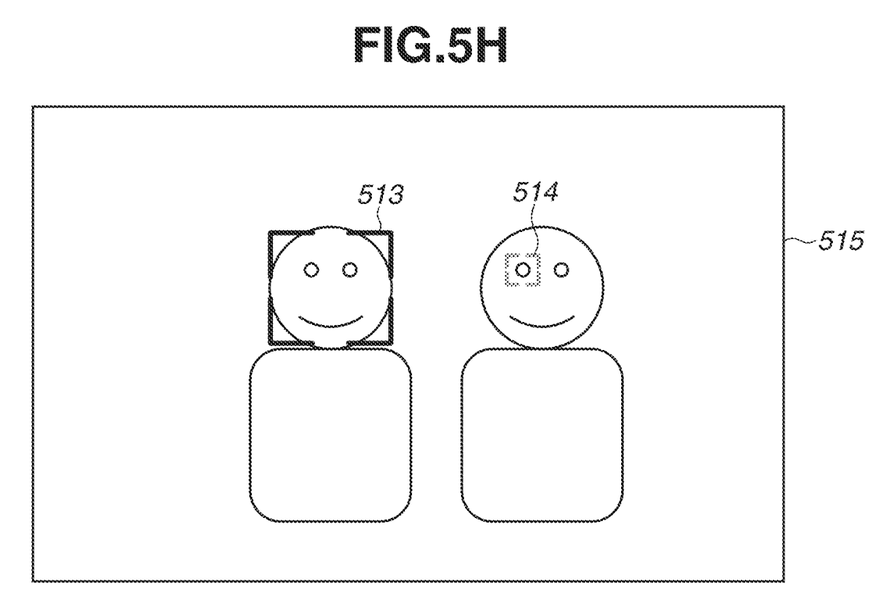

As another example, before the operation for switching the sub subject is performed, a main subject frame 513 is displayed on the left-side person and a sub subject frame 512 is displayed on the pupil of the left-side person as illustrated in FIG. 5G. In a case where the operation for switching the sub subject is performed by the sub electronic dial 74 being rotationally operated in this state, the main subject frame 513 displayed on the left-side person remains unchanged while a sub subject frame 514 is moved from the pupil of the left-side person to the pupil of the right-side person and displayed thereon as illustrated in FIG. 5H.

In the present exemplary embodiment, the subject with the sub subject frame displayed thereon is sequentially switched in the clockwise or counterclockwise direction in accordance with the order in which the detected sub subjects are laid out in accordance with the direction in which the sub electronic dial 74 is rotated (in the clockwise or counterclockwise direction) and the amount by which the sub electronic dial 74 is operated. The subject with the sub subject frame displayed thereon may be sequentially switched in a predetermined direction such as the clockwise direction and the counterclockwise direction in accordance with the order in which the subjects belonging to the detection type of the sub subject are laid out based on the number of times that the button operation is performed.

In this manner, the user can easily change the sub subject within the same type with an intuitive operation while viewing the live view image.

In step S312, the system control unit 50 determines whether to end the selection of the main subject and the sub subject. If the system control unit 50 determines to continue the selection of the main subject and the sub subject (NO in step S312), the processing proceeds to step S302. If the system control unit 50 determines to end the selection of the main subject and the sub subject (YES in step S312), the series of processes illustrated in the flowchart is ended.

According to the digital camera 100 of the present exemplary embodiment configured in this manner, the desired subject can be switched with excellent usability on the imaging control apparatus capable of detecting a plurality of types of subjects.

Regarding the above-described various controls that have been described assuming that the system control unit 50 performs them, a single hardware device may perform them, or a plurality of hardware devices may control the entire apparatus by dividing the processing among them. Having described the present disclosure in detail based on the representative exemplary embodiments thereof, the present disclosure is not limited to these specific exemplary embodiments, and also covers various embodiments within a range that does not depart from the spirit of the present disclosure. Further, each of the above-described exemplary embodiments merely indicates one exemplary embodiment of the present disclosure, and each of the exemplary embodiments can also be combined as appropriate.

The present disclosure has been described referring to the example in which the present disclosure is applied to the digital camera 100 in the above-described exemplary embodiments, but is not limited to this example and can be applied to any apparatus including an imaging unit. The present disclosure can be applied to, for example, a personal computer, a personal digital assistant (PDA), a mobile phone terminal, a mobile image viewer, a printer apparatus including a display, a digital photo frame, a music player, a game machine, an electronic book reader, a tablet terminal, a smart-phone, a projector, and home electronics and an in-vehicle apparatus including a display.

Other Exemplary Embodiments

The present disclosure can also be realized by processing that supplies a program capable of fulfilling one or more functions of the above-described exemplary embodiments to a system or an apparatus via a network or a storage medium, and causes one or more processors in a computer of this system or apparatus to read out and execute the program. The present disclosure can also be realized by a circuit (for example, an application specific integrated circuit (ASIC)) capable of fulfilling one or more functions.

According to the present disclosure, the desired subject can be switched with excellent usability when a plurality of types of subjects can be detected.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-016217, filed Feb. 3, 2020, which is hereby incorporated by reference herein in its entirety.

What is claimed is:

1. An imaging control apparatus comprising:
a processor; and
a memory storing instructions which, when executed by the processor, configure the processor of the imaging control apparatus to:
detect, from a captured image, subjects belonging to a plurality of types including a first type and a second type;
select types of subjects to be set as the first type and the second type;
switch a type for which predetermined processing is to be performed from any of the first type and the second type;
select any subject from among a plurality of subjects belonging to the second type in the captured image and among the detected subjects; and
perform control so as to display a first subject belonging to the first type in a first display manner and display a second subject belonging to the second type in a second display manner in a case where the type for which the predetermined processing is to be performed is switched to the first type, and display the second subject in the first display manner in response to switching of the type for which the predetermined processing is to be performed from the first type to the second type.

2. The imaging control apparatus according to claim 1, wherein the selected subject belonging to the second type as a target for the predetermined processing in response to the switching of the type for which the predetermined processing is to be performed from the first type to the second type.

3. The imaging control apparatus according to claim 1, wherein the instructions which, when executed by the processor, further configure the processor of the imaging control apparatus to store master data with which feature data for each of the plurality of types is registered, and wherein the subjects belonging to the first type and the second type are detected using the master data corresponding to the first type and the master data corresponding to the second type.

4. The imaging control apparatus according to claim 1, wherein, in a case where the type for which the predetermined processing is to be performed is switched to the first type, in response to a first operation for selecting any subject from among a plurality of subjects belonging to the first type in the captured image among the detected subjects, the selected subject is displayed in the first display manner and the first subject displayed in the first display manner is set as a target for the predetermined processing.

5. The imaging control apparatus according to claim 4, wherein, in a case where the type for which the predetermined processing is to be performed is switched to the first type, in response to a second operation for selecting any subject from among the plurality of subjects belonging to the second type in the captured image among the detected subjects, the selected subject is displayed in the second display manner, and the second subject displayed in the second display manner is set as a target for the predetermined processing in response to the switching of the type for which the predetermined processing is to be performed from the first type to the second type.

6. The imaging control apparatus according to claim 5, wherein the first operation for selecting any subject from among the plurality of subjects belonging to the first type in the captured image among the detected subjects and the second operation for selecting any subject from among the plurality of subjects belonging to the second type in the captured image among the detected subjects are set, and the first operation and the second operation are performed by operations on different predetermined operation members.

7. The imaging control apparatus according to claim 1, wherein the plurality of types include at least any one of a human, an animal, a human pupil, an animal pupil, and a vehicle.

8. The imaging control apparatus according to claim 1, wherein, in a case where the type for which the predetermined processing is to be performed is switched to the first type, in response to the selection of the type to be set as the first type, the subject belonging to the selected type is displayed in the first display manner.

9. The imaging control apparatus according to claim 1, wherein, in a case where the type for which the predetermined processing is to be performed is switched to the second type, in response to the selection of the type to be set as the second type, the subject belonging to the selected type is displayed in the second display manner.

10. The imaging control apparatus according to claim 1, wherein the selected types of subjects are one of the combinations among predetermined combinations of the first type and the second type.

11. The imaging control apparatus according to claim 1, wherein the predetermined processing includes at least any one of automatic focus processing, automatic exposure processing, and tracking processing.

12. The imaging control apparatus according to claim 1, wherein any subject from among a plurality of subjects belonging to the first type in the captured image among the detected subjects is selected in response to a first operation and any subject is selected from among the plurality of subjects belonging to the second type in the captured image among the detected subjects in response to a second operation, and the first operation and the second operation are performed by operations on different predetermined operation members.

13. A method for controlling an imaging control apparatus, the method comprising:
  detecting, from a captured image, subjects belonging to a plurality of types including a first type and a second type;
  select types of subjects to be set as the first type and the second type;
  switching a type for which predetermined processing is to be performed from any of the first type and the second type;
  selecting any subject from a plurality of subjects belonging to the second type in the captured image and among the detected subjects; and
  performing control so as to display a first subject belonging to the first type in a first display manner and display a second subject belonging to the second type in a second display manner in a case where the type for which the predetermined processing is to be performed is switched to the first type by the switching, and display the second subject in the first display manner in response to switching of the type for which the predetermined processing is to be performed from the first type to the second type by the switching.

14. A non-transitory computer-readable storage medium storing a program for causing a computer to execute the control method, the method comprising:
  detecting, from a captured image, subjects belonging to a plurality of types including a first type and a second type from a captured image;
  select types of subjects to be set as the first type and the second type;
  switching a type for which predetermined processing is to be performed from any of the first type and the second type;
  selecting any subject from a plurality of subjects belonging to the second type in the captured image and among the detected subjects; and
  performing control so as to display a first subject belonging to the first type in a first display manner and display a second subject belonging to the second type in a second display manner in a case where the type for which the predetermined processing is to be performed is switched to the first type by the switching, and display the second subject in the first display manner in response to switching of the type for which the predetermined processing is to be performed from the first type to the second type by the switching.

* * * * *

UNITED STATES PATENT AND TRADEMARK OFFICE
CERTIFICATE OF CORRECTION

| | | |
|---|---|---|
| PATENT NO. | : 11,625,948 B2 | Page 1 of 1 |
| APPLICATION NO. | : 17/158700 | |
| DATED | : April 11, 2023 | |
| INVENTOR(S) | : Genjiro Shibagami | |

It is certified that error appears in the above-identified patent and that said Letters Patent is hereby corrected as shown below:

On the Title Page

The name on Assignee item (73) reading:
-Canon Kabashiki Kaisha-
Should be changed to:
--Canon Kabushiki Kaisha--.

Signed and Sealed this
Twentieth Day of June, 2023

Katherine Kelly Vidal
*Director of the United States Patent and Trademark Office*